(12) United States Patent
Shao et al.

(10) Patent No.: US 12,126,729 B2
(45) Date of Patent: Oct. 22, 2024

(54) METHOD AND APPARATUS FOR ISSUING SMART CONTRACT

(71) Applicant: Jingdong Technology Information Technology Co., Ltd., Beijing (CN)

(72) Inventors: Zhuguang Shao, Beijing (CN); Zhe Wang, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 168 days.

(21) Appl. No.: 17/597,869

(22) PCT Filed: Apr. 1, 2020

(86) PCT No.: PCT/CN2020/082673
§ 371 (c)(1),
(2) Date: Jan. 27, 2022

(87) PCT Pub. No.: WO2021/057005
PCT Pub. Date: Apr. 1, 2021

(65) Prior Publication Data
US 2022/0261894 A1    Aug. 18, 2022

(30) Foreign Application Priority Data
Sep. 24, 2019   (CN) .......................... 201910904526.5

(51) Int. Cl.
*H04L 9/32*      (2006.01)
*H04L 9/00*      (2022.01)

(52) U.S. Cl.
CPC .............. *H04L 9/3236* (2013.01); *H04L 9/50* (2022.05); *G06Q 2220/10* (2013.01)

(58) Field of Classification Search
CPC ...... H04L 9/3236; H04L 9/50; G06Q 2220/10
See application file for complete search history.

(56) References Cited

U.S. PATENT DOCUMENTS 10,402,594 B2     9/2019   Takaai et al.
10,832,239 B2 *  11/2020   Xia ..................... G06F 21/6209
11,102,001 B2     8/2021   Sato
(Continued)

FOREIGN PATENT DOCUMENTS

CN        106100981 A      11/2016
CN        107943469 A       4/2018
(Continued)

OTHER PUBLICATIONS

Xiao Wei, English translation of foreign patent CN108960830A, published Dec. 7, 2018, pp. 1-16 (Year: 2018).*
(Continued)

*Primary Examiner* — S. Sough
*Assistant Examiner* — Zheng Wei
(74) *Attorney, Agent, or Firm* — Blank Rome LLP

(57) ABSTRACT

A method and an apparatus for issuing a smart contract are provided. The method may include: acquiring the smart contract; determining whether the smart contract comprises a preset function; generating, in response to determining that the smart contract does not include the preset function, verification data of the smart contract based on a proof-of-work technology; and sending a request for issuing the smart contract re based n the verification data.

15 Claims, 5 Drawing Sheets

(56) References Cited

U.S. PATENT DOCUMENTS

| | | |
|---|---|---|
| 11,144,893 B2 | 10/2021 | Li et al. |
| 2019/0130368 A1 | 5/2019 | Li et al. |
| 2019/0158275 A1 | 5/2019 | Beck |
| 2019/0324772 A1 | 10/2019 | Fan et al. |
| 2020/0175156 A1* | 6/2020 | Bhamidipati ...... G06Q 20/3678 |
| 2020/0327044 A1* | 10/2020 | Pi ..................... G06F 11/3684 |
| 2020/0334379 A1* | 10/2020 | DeRosa-Grund ..... G06F 21/645 |
| 2021/0049281 A1* | 2/2021 | Braghin ................ H04L 9/0643 |
| 2021/0065188 A1* | 3/2021 | Levacher ............. G06Q 20/065 |
| 2022/0294776 A1* | 9/2022 | Qiu ..................... H04L 63/0823 |

FOREIGN PATENT DOCUMENTS

| | | | |
|---|---|---|---|
| CN | 107944868 A | | 4/2018 |
| CN | 108459860 A | | 8/2018 |
| CN | 108664787 A | | 10/2018 |
| CN | 108881312 A | | 11/2018 |
| CN | 108960830 A | | 12/2018 |
| CN | 109508981 A | | 3/2019 |
| CN | 109542421 A | | 3/2019 |
| CN | 109829296 A | | 5/2019 |
| CN | 110111104 A | | 8/2019 |
| CN | 110245514 A | | 9/2019 |
| CN | 110688428 A | | 1/2020 |
| JP | 2017/157926 A | | 9/2017 |
| JP | 2018/128723 A | | 8/2018 |
| JP | 2019/003309 A | | 1/2019 |
| JP | 2019/083013 A | | 5/2019 |
| KR | 101963752 B1 | | 3/2019 |
| WO | WO-2019024674 A1 | | 2/2019 |

OTHER PUBLICATIONS

Ence et al., English translation of China Patent CN109508981A, filed on Sep. 15, 2017, published on Mar. 22, 2019, pp. 1-16 (Year: 2019).*

Hazari et al., A Parallel Proof of Work to Improve Transaction Speed and Scalability in Blockchain Systems, published by IEEE, Published in: 2019 IEEE 9th Annual Computing and Communication Workshop and Conference (CCWC), Jan. 2019, pp. 0916-0921 (Year: 2019).*

Mohanta et al., "An overview of smart contract and use cases in blockchain technology", published by IEEE, 9th ICCCNT Jul. 10-12, 2018, 2018, IISC, Bengaluru Bengaluru, India, pp. 1-4 (Year: 2018).*

Iputhal et al., "Proof-of-Authentication for scalable Blockchain in Resource-Constrained Distributed Systems", published by IEEE, International conference on Consumer Electronics (ICCE), pp. 1-6 (Year: 2019).*

Mehta et al., "Smart Contracts: Automated Stipulations on Blockchain", published by IEEE, 2018 International Conference on Computer Communication and Informatics (ICCCI-2018), Jan. 4-6, 2018, Coimbatore, India, pp. 1-5 (Year: 2018).*

Cheng et al., "Blockchain and Smart Contract for Digital Certificate", published by IEEE, Proceedings of IEEE International Conference on Applied System Innovation 2018 IEEE ICASI 2018—Meen, Prior & Lam (Eds), pp. 1046-1051 (Year: 2018).*

International Search Report for PCT/CN2020/08267, dated Jun. 23, 2020, 2 pages.

Chinese Office Action for CN201910904526.5, dated Aug. 25, 2020, 8 pgs.

* cited by examiner

METHOD AND APPARATUS FOR ISSUING SMART CONTRACT

RELATED APPLICATIONS

This patent application is a national stage of International Application No. PCT/CN2020/082673, filed on Apr. 1, 2020, which claims the priority from Chinese Patent Application No. 201910904526.5, filed on Sep. 24, 2019 and titled "Method and Apparatus for Issuing Smart Contract," the applicant of which is Beijing Haiyi Tongzhan Information Technology Co., Ltd. Both of the aforementioned applications are hereby incorporated by reference in their entireties.

TECHNICAL FIELD

Embodiments of the present disclosure relate to the technical field of computers, and specifically to a method for issuing a smart contract and an apparatus for issuing a smart contract.

BACKGROUND

At present, combined application of a smart contract and a blockchain is a research direction in the current technical field of blockchains. The smart contract is a computer protocol for spreading, verifying, or executing a contract by an information-based approach. The smart contract allows for trusted transactions without a third party, which are traceable and irreversible.

With the mature development of blockchain technologies, a user may manipulate data based on the smart contract. Due to the diversity of user needs, many blockchain systems (such as Fabric, Ethereum, and CITA) are now beginning to develop smart contracts using a Turing-complete language (such as Java, Python, C, or C++).

SUMMARY

Embodiments of the present disclosure present a method for issuing a smart contract and an apparatus for issuing a smart contract.

In a first aspect, an embodiment of the present disclosure provides a method for issuing a smart contract, including: acquiring the smart contract; determining whether the smart contract includes a preset function; generating, in response to determining that the smart contract does not include the preset function, verification data of the smart contract based on a proof-of-work technology; and sending a request for issuing the smart contract based on the verification data.

In a second aspect, an embodiment of the present disclosure provides an apparatus for issuing a smart contract, including: an acquiring unit configured to acquire the smart contract; a determining unit configured to determine whether the smart contract includes a preset function; a generating unit configured to generate, in response to determining that the smart contract does not include the preset function, verification data of the smart contract based on a proof-of-work technology; and a sending unit configured to send a request for issuing the smart contract based on the verification data.

In a third aspect, an embodiment of the present disclosure provides a terminal device, including: one or more processors; and a storage apparatus configured to store one or more programs; where the one or more programs, when executed by the one or more processors, cause the one or more processors to implement the method according to any one implementation in the first aspect.

In a fourth aspect, an embodiment of the present disclosure provides a computer readable medium storing a computer program thereon, where the computer program, when executed by a processor, implements the method according to any one implementation in the first aspect.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF EMBODIMENTS

The present disclosure will be further described in detail below in combination with the accompanying drawings and the embodiments. It should be understood that the specific embodiments described here are merely used for explaining the relevant disclosure, rather than limiting the disclosure. In addition, it should be further noted that, for ease of description, only the portions related to the relevant disclosure are shown in the accompanying drawings.

It should be noted that some embodiments in the present disclosure and some features in the embodiments may be combined with each other on a non-conflict basis. The present disclosure will be described in detail below with reference to the accompanying drawings and in combination with the embodiments.

Figure 1:
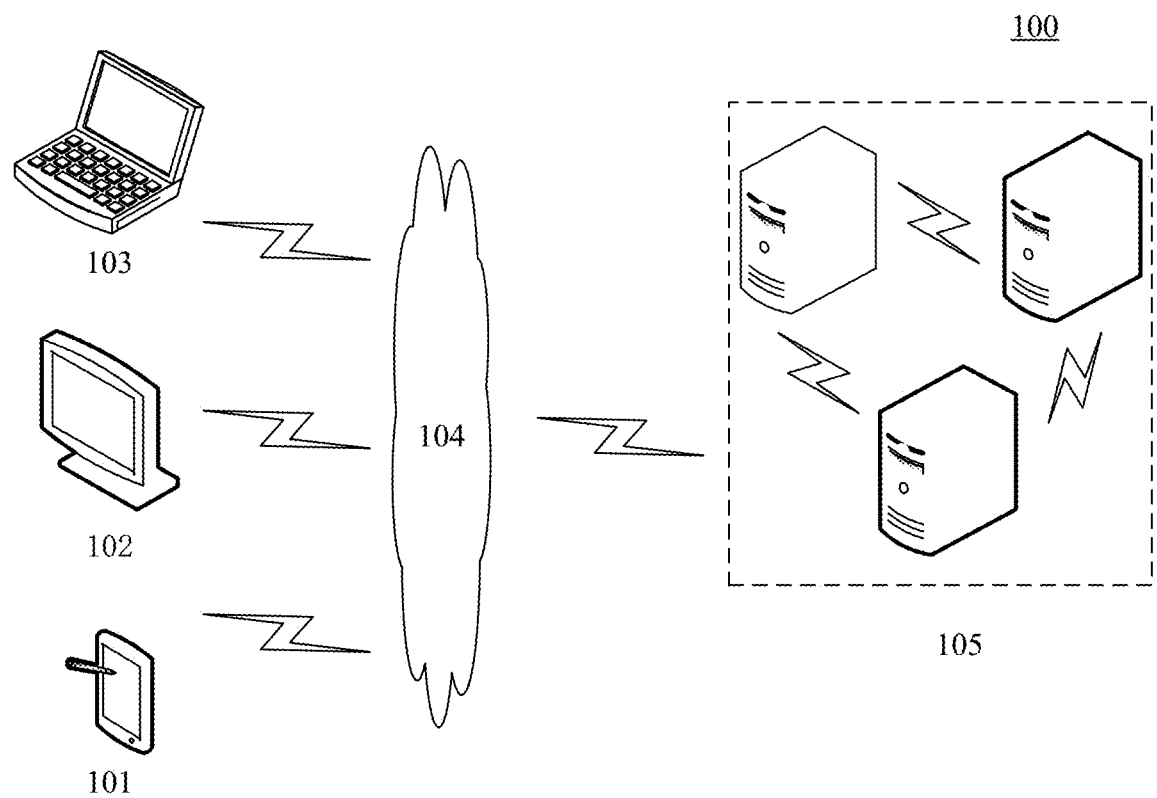
FIG. 1 is a diagram of an example system architecture in which an embodiment of the present disclosure may be implemented.

FIG. 1 shows an example architecture 100 in which a method for issuing a smart contract or an apparatus for issuing a smart contract according to an embodiment of the present disclosure may be implemented.

As shown in FIG. 1, the system architecture 100 may include terminal devices 101, 102, and 103, a network 104, and a blockchain system 105. The blockchain system 105 may include one or more nodes, which are communicatively connectable. The network 104 serves as a medium providing a communication link between the terminal devices 101, 102, and 103, and the blockchain system 105. The network 104 may include various types of connections, such as wired or wireless communication links, or optical cables.

The terminal devices 101, 102, and 103 interact with the blockchain system 105 via the network 104, for example, to receive or send a message. The terminal devices 101, 102, and 103 may be provided with various communication client applications, for example, a smart contract development platform and a blockchain application platform.

The terminal devices 101, 102, and 103 may be hardware, or may be software. When the terminal devices 101, 102, and 103 are hardware, the terminal devices may be various electronic devices, including but not limited to a smart phone, a tablet computer, an e-book reader, a laptop portable computer, a desktop computer, and the like. When the terminal devices 101, 102, and 103 are software, the terminal devices may be installed in the above-listed electronic devices, may be implemented as a plurality of software programs or software modules (e.g., a plurality of software programs or software modules configured to provide distributed services), or may be implemented as a single software program or software module. This is not specifically limited here.

One or more nodes in the blockchain system 105 may provide various services, for example, receiving a request for issuing the smart contract sent from the terminal devices 101, 102, and 103, and generating a corresponding smart contract execution transaction to complete the smart contract execution.

It should be noted that the method for issuing a smart contract provided in some embodiment of the present disclosure is generally executed by the terminal devices 101, 102, and 103. Accordingly, the apparatus for issuing a smart contract is generally provided in the terminal devices 101, 102, and 103.

It should be pointed out that the nodes in the blockchain system 105 may be a single server, or may be composed of a plurality of servers or a plurality of server clusters. The server may be hardware, or may be software. When the server is hardware, the server may be implemented as a distributed server cluster composed of a plurality of servers, or may be implemented as a single server. When the server is software, the server may be implemented as a plurality of software programs or software modules (e.g., a plurality of software programs or software modules for providing distributed services), or may be implemented as a single software program or software module. This is not specifically limited here.

It should be understood that the numbers of terminal devices, networks, and blockchain systems in FIG. 1 are merely illustrative. Any number of terminal devices, networks, and blockchain systems may be provided based on actual requirements.

Figure 2:
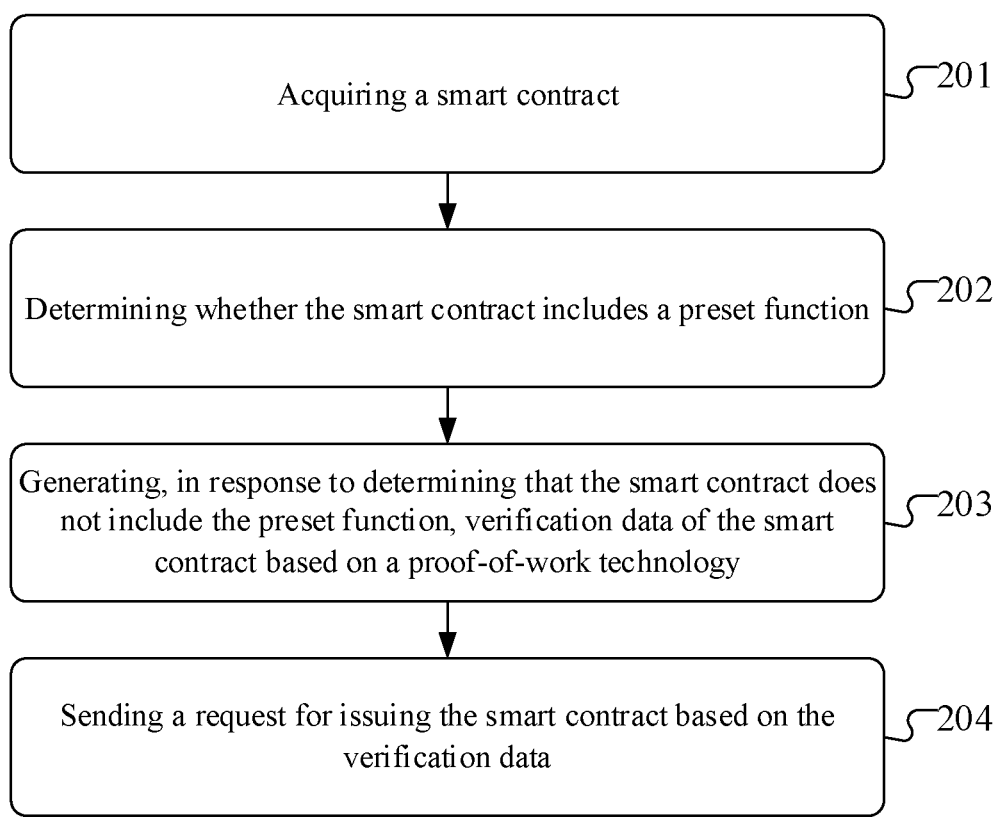
FIG. 2 is a flowchart of a method for issuing a smart contract according to an embodiment of the present disclosure.

Further referring to FIG. 2, a process 200 of a method for issuing a smart contract according to an embodiment of the present disclosure is shown. The method for issuing a smart contract includes the following steps:

Step 201: acquiring a smart contract.

In the present embodiment, an executing body (e.g., the terminal devices 101, 102, and 103 shown in FIG. 1) of the method for issuing a smart contract may acquire the smart contract locally or from other devices. The smart contract may be pre-developed by a skilled person based on actual application requirements. A development language of the smart contract may be flexibly selected based on actual application requirements. For example, the development language may be various Turing-complete languages (such as Java, Python, C, and C++).

Step 202: determining whether the smart contract includes a preset function.

In the present embodiment, the preset function may be pre-specified by a skilled person based on actual application requirements. Therefore, by checking the smart contract, whether the smart contract includes a function that may cause an unexpectation may be known in time, and then a processing logic of the smart contract may be controlled before the issuance.

In some alternative implementations of the present embodiment, the preset function includes a function damaging the security of the smart contract. For example, in consideration of the code security of the smart contract, the preset function may be at least one of: a function that may cause the smart contract to be invalid, a function that may cause an infinite loop, a function that may cause recursive stack exhaustion, a function that may cause leakage of important information, a function that may cause unauthorized access, a function that may cause a logical loophole of the smart contract, and the like.

In some alternative implementations of the present embodiment, the preset function includes a function damaging the security of a blockchain system. It should be understood that the blockchain system may refer to a blockchain system for completing an operation of executing the smart contract. For example, the preset function may be a function that influences consensus of each node in the blockchain system.

Alternatively, the preset function includes at least one of: a function using a time-varying variable, a function executing an input/output (I/O) operation of a file, a function invoking a script to control a system, a function executing a network-related operation, and a function controlling an environment variable of a system.

The time-varying variable may refer to a variable with inconsistent executing results each time, for example, a random number or a timestamp. The function using a time-varying variable may cause inconsistent executing results of nodes that execute the smart contract simultaneously.

The function executing an input/output (I/O) operation of a file tends to affect the data consistency, for example, may cause incorrect information to be written into a blockchain database. The function executing a network-related operation (such as a function instructing access to a network resource, or a function instructing to send a network request) tends to affect the communication security of the blockchain system.

The function invoking a script to control a system, and the function controlling an environment variable of a system tend to affect access control of the blockchain system, for example, may cause occurrence of, e.g., unauthorized access, thereby resulting in hostile attacks on the blockchain system.

It should be understood that for different application requirements, specific contents of the smart contract may be quite different. For example, possible security issues existing in different smart contracts and possible harms to the blockchain system may also be different. Therefore, the preset function may be flexibly set based on actual application requirements.

In the present embodiment, various methods may be flexibly selected to inspect whether the smart contract includes the preset function. For example, identifier information of each function included in the smart contract may be acquired using various program analysis methods or program analysis applications, and then whether the acquired identifier information of each function includes identifier information of the preset function is inspected.

Identifier information of a function may be determined based on a class name of the function, a name of the function, parameter information of the function, and the like. For example, a triad composed of the class name of the function, the name of the function, and the parameter information of the function may be used as the identifier information of the function. It should be understood that, for different development languages, whether the smart contract includes the preset function may be inspected using different methods, or different identification methods may be designed to identify the function.

If the acquired identifier information of the functions includes the identifier information of the preset function, it is indicated that the smart contract includes the preset function. Otherwise, if the acquired identifier information of the functions does not include the identifier information of the preset function, it is indicated that the smart contract does not include the preset function.

Alternatively, whether a target custom function in the smart contract includes the preset function may be determined. The target custom function may include a function in the smart contract except for a library function and a preset inspection-free function. The library function may be an underlying function provided by the development language of the smart contract itself. The inspection-free function may refer to a function that is preset by a skilled person and does not need to be inspected. The target custom function may refer to various functions compiled by a developer in the smart contract. For example, the target custom function may be a function that meets a preset condition and is compiled by the developer.

Alternatively, whether the smart contract includes the preset function may be determined through the following steps: first analyzing an entry function of the smart contract to determine internal functions invoked by the entry function, then determining the internal functions invoked by the entry function as a target internal function set, selecting an internal function from the target internal function set for use as a target function, and executing the following inspection steps:

Step I: determining whether the target function has been inspected.

Whether the target function has been inspected is first determined, to avoid failure to jump out of a loop in the case of recursive invoking or embedded invoking of the function.

Step II: selecting, in response to determining that the target function has been inspected and the number of unselected internal functions in the target internal function set is not 0, an unselected internal function from the target internal function set for use as the target function, and continuing to execute the above inspection steps; and determining, in response to determining that the target function has been inspected and the number of unselected internal functions in the target internal function set is 0, that the smart contract does not include the preset function.

Step III: determining, in response to determining that the target function has not been inspected, whether the target function is the preset function, and labeling the target function as having been inspected.

Step IV: outputting, in response to determining that the target function is the preset function, a prompt message to prompt the smart contract being abnormal.

Step V: determining, in response to determining that the target function is not the preset function, whether the target function is the library function or the preset inspection-free function.

Step VI: selecting, in response to determining that the target function is the library function or the preset inspection-free function and the number of unselected internal functions in the target internal function set is not 0, an unselected internal function from the target internal function set for use as the target function, and continuing to execute the above inspection steps; and determining, in response to determining that the target function is the library function or the preset inspection-free function and the number of unselected internal functions in the target internal function set is 0, that the smart contract does not include the preset function.

Step VII: analyzing and acquiring, in response to determining that the target function is not the library function or the preset inspection-free function, internal functions invoked by the target function for use as a target internal function set, selecting an internal function from the target internal function set for use as the target function, and executing the above inspection steps.

Step 203: generating, in response to determining that the smart contract does not include the preset function, verification data of the smart contract based on a proof-of-work technology.

In the present embodiment, Proof-of-Work (PoW) is an economic countermeasure against service and resource abuse, or for blocking service attacks. Generally, a user is required to perform some moderately time-consuming complex computations, the answers may be quickly checked by a service party, and the time, device and energy thus consumed are used as guarantee costs to guarantee that the service and resources are used by real demands. At present, a commonly used technical principle of the proof-of-work technology is a hash function. The proof-of-work technology is a prior art that is widely researched and applied at present. The description will not be repeated here.

In the present embodiment, based on the proof-of-work technology, the verification data, that can only be obtained by consumption of certain costs (such as time and computing resources) may be generated. The verification data may be used for verifying the smart contract in various subsequent processes of the smart contract, so as to avoid situations, e.g., malicious forgery of the smart contract by a criminal.

It should be understood that the proof-of-work technology may use diverse technical principles, and the proof-of-work technology using different technical principles may generate the verification data of the smart contract by different approaches.

As an example, using a proof-of-work technology which is based on a hash function, a hash operation may be performed continuously on the smart contract until obtaining a computing result that meets a preset requirement, and then the obtained computing result that meets the preset requirement may be used as the verification data of the smart contract. The preset requirement may be set by a skilled person based on an actual application scenario. For example, the preset requirement may be that: first N digits of the obtained computing result are 0.

In some alternative implementations of the present embodiment, in response to determining that the smart contract includes the preset function, a prompt message may be outputted to prompt the smart contract being abnormal, such that the user may promptly inspect and adjust the smart contract.

Step 204: sending a request for issuing the smart contract based on the verification data.

In the present embodiment, after the verification data is obtained, the smart contract may be further compiled, and packaged in combination with the verification data, thereby sending a request based on a desired blockchain platform to complete the issuance of the smart contract. The sent request for issuing the smart contract may include information for indicating the verification data of the smart contract. For example, the request for issuing the smart contract may include the verification data of the smart contract, and may also include identifier information (such as an address) of the verification data of the smart contract.

Figure 3:
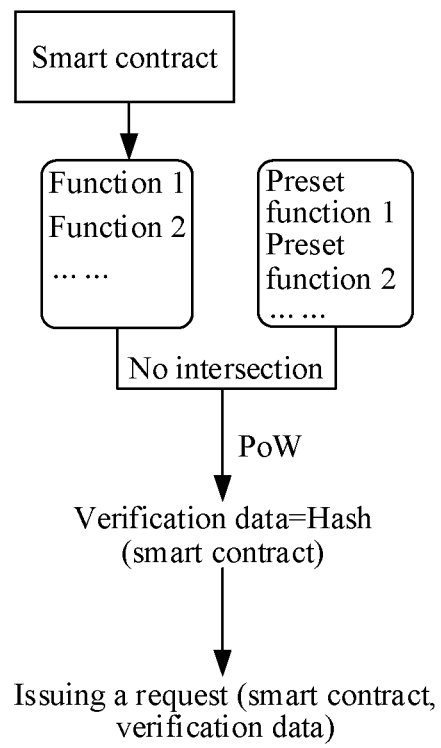
FIG. 3 is a schematic diagram of an application scenario of the method for issuing a smart contract according to an embodiment of the present disclosure.

Further referring to FIG. 3, FIG. 3 is a schematic application scenario 300 of the method for issuing a smart contract according to the present embodiment. In the application scenario of FIG. 3, a smart contract pre-compiled by a developer may be first acquired, then functions in the smart contract may be analyzed, and whether the functions in the smart contract include a preset function of pre-designated preset functions may be analyzed. If the functions in the smart contract do not include any one of the pre-designated preset function, a hash operation may be performed on the smart contract to obtain a computing result that meets a PoW requirement for use as verification data of the smart contract. Further, operations such as compiling and packaging the smart contract and the verification data may be requested to complete the issuance of the smart contract.

The method for issuing a smart contract provided in the above embodiments of the present disclosure first inspects the smart contract to determine whether the smart contract includes a preset function before requesting for issuing the smart contract, thereby controlling a processing logic of the smart contract, and preventing the execution of the smart contract from causing unexpected results. After determining that the smart contract does not include the preset function, verification data of the smart contract may be further generated based on a proof-of-work technology, to guarantee the security of subsequent processes such as the issuance and execution of the smart contract, and prevent the issuance of a smart contract that may harm a blockchain system.

Figure 4:
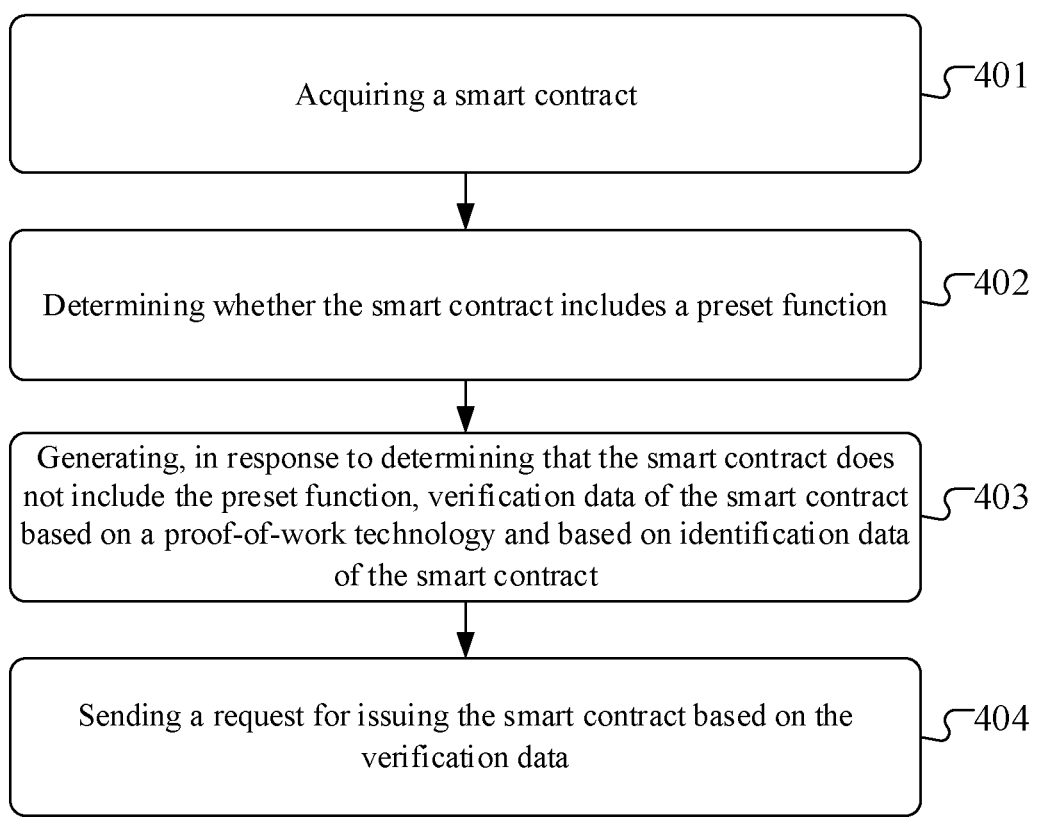
FIG. 4 is a flowchart of the method for issuing a smart contract according to another embodiment of the present disclosure.

Further referring to FIG. 4, a process 400 of the method for issuing a smart contract according to another embodiment is shown. The process 400 of the method for issuing a smart contract includes the following steps:

Step 401: acquiring a smart contract.

Step 402: determining whether the smart contract includes a preset function.

The related description of step 201 and step 202 in the corresponding embodiment of FIG. 2 may refer to specific execution processes of the above step 401 and step 402. The description will not be repeated here.

Step 403: generating, in response to determining that the smart contract does not include the preset function, verification data of the smart contract based on a proof-of-work technology and based on identification data of the smart contract.

In the present embodiment, the identification data may include at least one of: a random array and a preset identifier of a blockchain system. The random array may be generated using various existing random algorithms. The preset identifier of the blockchain system may refer to an identifier preset for the blockchain system.

In this case, verification data that meets a preset workload requirement may be generated in combination with the identification data and the smart contract. Therefore, the difficulty of generating the verification data of the smart contract may be further increased, thereby further increasing the difficulty of forging the smart contract, and improving the security of subsequent processes of the smart contract.

In the present embodiment, the proof of work may be realized based on operations such as hash operation, convolution derivation, and large prime number decomposition.

Taking the hash operation as an example, the verification data of the smart contract may be generated through the following steps:

executing following computing steps: performing a hash operation on the identification data and the smart contract to obtain a computing result; determining whether the obtained computing result meets a preset workload requirement; determining, in response to determining that the obtained computing result meets the preset workload requirement, the obtained computing result as the verification data of the smart contract; and continuing, in response to determining that the obtained computing result does not meet the preset workload requirement, to execute the above computing steps.

For example, the preset workload requirement may be that: first N digits of the obtained computing result are each 1. In this case, a first random array may be generated, and then a hash operation may be performed on the first random array, the preset identifier of the blockchain system, and the smart contract to obtain a first computing result. If first N digits of the first computing result are not all 1, a second random array may be generated, and then a hash operation may be performed on the second random array, the preset identifier of the blockchain system and the smart contract to obtain a second computing result. If first N digits of the second computing result are each 1, the second computing result may be used as the verification data of the smart contract.

Alternatively, whether the smart contract is an officially issued smart contract may be determined. In response to determining that the smart contract is the officially issued smart contract, the verification data of the smart contract may be generated based on the proof-of-work technology and based on the random array. In response to determining that the smart contract is not the officially issued smart contract (such as a smart contract issued for test), the verification data may be generated based on the proof-of-work technology only using the smart contract, to reduce the resource consumption in the test issuance process.

Step 404: sending a request for issuing the smart contract based on the verification data.

In the present embodiment, after the verification data is obtained, the smart contract may be further compiled, and the verification data may be packaged in combination with the random array and/or a preset identifier of the blockchain system, thereby sending a request based on a desired blockchain platform to complete the issuance of the smart contract.

Based on the above specific approach of generating the verification data of the smart contract, a corresponding inspection approach may be set for issuing the smart contract. As an example, before the smart contract is issued, the random array corresponding to the smart contract, and/or the preset identifier of the blockchain system, and the verification data of the smart contract may be acquired based on the request for issuing the smart contract.

It should be understood that if the verification data of the smart contract is generated based on the random array, the random array and the verification data corresponding to the smart contract may be acquired based on the request for issuing the smart contract; and if the verification data of the smart contract is generated based on the random array and the preset identifier of the blockchain system, the random array corresponding to the smart contract, the preset identifier of the blockchain system, and the verification data may be acquired based on the request for issuing the smart contract.

Then, whether the smart contract is abnormal may be verified based on the acquired random array corresponding to the smart contract, and/or the acquired preset identifier of the blockchain system, and the acquired verification data of the smart contract. For example, if the verification data of the smart contract is generated based on the random array and the preset identifier of the blockchain system, a hash operation result of the random array, the blockchain system, and the smart contract may be acquired by computing, and then whether the hash operation result obtained by computing is the same as the acquired verification data may be determined.

If the hash operation result obtained by computing is different from the acquired verification data, it is indicated that the smart contract is abnormal (e.g., may be a smart contract forged by a criminal), then a prompt message may be outputted to prompt the smart contract being abnormal, and the issuance cannot be completed temporarily.

If the hash operation result obtained by computing is the same as the acquired verification data, whether the acquired verification data meets a preset PoW requirement may be further verified. If the acquired verification data does not meet the preset PoW requirement, it is indicated that the smart contract is abnormal, then the prompt message may be outputted to prompt the smart contract being abnormal, and the issuance cannot be completed temporarily. If the acquired verification data meets the preset PoW requirement, it is indicated that the smart contract is normal, and the smart contract may be further processed to complete the issuance of the smart contract.

After determining that the smart contract does not include a preset function, the method provided in the above embodiments of the present disclosure may generate verification data of the smart contract based on a proof-of-work technology, and based on identification data of the smart contract, such as a random array and a preset identifier of a blockchain system, thereby increasing the difficulty of generating the verification data of the smart contract, and contributing to reducing random issuance of the smart contract. Further, before the smart contract is issued, the smart contract may be further verified based on a random array, a preset identifier of the blockchain system, and the like, thereby effectively inspecting a forged smart contract, and further guaranteeing the security of the issued smart contract.

Figure 5:
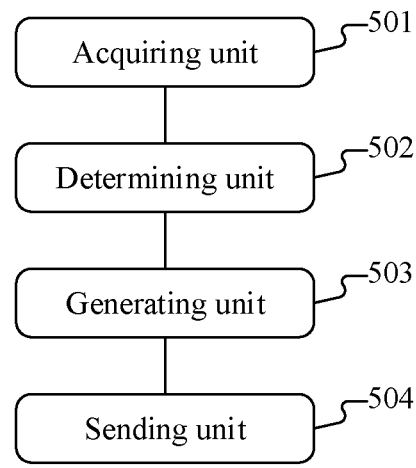
FIG. 5 is a schematic structural diagram of an apparatus for issuing a smart contract according to an embodiment of the present disclosure.

Further referring to FIG. 5, as an implementation of the method shown in the above figures, an embodiment of the present disclosure provides an apparatus for issuing a smart contract. The embodiment of the apparatus corresponds to the embodiment of the method shown in FIG. 2. The apparatus may be specifically applied to various electronic devices.

As shown in FIG. 5, the apparatus 500 for issuing a smart contract of the present embodiment includes: a smart contract acquiring unit 501, a determining unit 502, a generating unit 503, and a sending unit 504. The smart contract acquiring unit 501 is configured to acquire the smart contract; the determining unit 502 is configured to determine whether the smart contract includes a preset function; the generating unit 503 is configured to generate, in response to determining that the smart contract does not include the preset function, verification data of the smart contract based on a proof-of-work technology; and the sending unit 504 is configured to send a request for issuing the smart contract based on the verification data.

The related description of step 201, step 202, step 203, and step 204 in the corresponding embodiment of FIG. 2 may be referred to for specific processing of the acquiring unit 501, the determining unit 502, the generating unit 503, and the sending unit 504 of the apparatus 500 for issuing a smart contract in the present embodiment and the technical effects thereof, respectively. The description will not be repeated here.

In some alternative implementations of the present embodiment, the preset function includes a function damaging the security of a blockchain system.

In some alternative implementations of the present embodiment, the apparatus 500 for issuing a smart contract further includes: an output unit (not shown in the figure) configured to output, in response to determining that the smart contract includes the preset function, a prompt message to prompt the smart contract being abnormal.

In some alternative implementations of the present embodiment, the preset function includes at least one of: a function using a time-varying variable, a function executing an input/output (I/O) operation of a file, a function invoking a script to control a system, a function executing a network-related operation, and a function controlling an environment variable of a system.

In some alternative implementations of the present embodiment, the generating unit 503 is further configured to generate the verification data of the smart contract based on the proof-of-work technology and based on identification data of the smart contract, where the identification data includes at least one of: a random array and a preset identifier of a blockchain system.

In some alternative implementations of the present embodiment, the generating unit 503 is further configured to execute the following computing steps: performing a hash operation on the identification data and the smart contract to obtain a computing result; determining whether the obtained computing result meets a preset workload requirement; determining, in response to determining that the obtained computing result meets the preset workload requirement, the obtained computing result as the verification data of the smart contract; and continuing, in response to determining that the obtained computing result does not meet the preset workload requirement, to execute the computing steps.

In some alternative implementations of the present embodiment, the generating unit 503 is further configured to generate, in response to determining that the smart contract is an officially issued smart contract, the verification data of the smart contract based on the proof-of-work technology and based on the identification data.

In some alternative implementations of the present embodiment, the determining unit 502 is further configured to determine whether a target custom function in the smart contract includes the preset function, where the target custom function includes a function in the smart contract except for a library function and a preset inspection-free function.

In the apparatus for issuing a smart contract provided in the above embodiments of the present disclosure, an acquiring unit acquires the smart contract; a determining unit determines whether the smart contract includes a preset function; a generating unit generates, in response to determining that the smart contract does not include the preset function, verification data of the smart contract based on a proof-of-work technology; and a sending unit sends a request for issuing the smart contract based on the verification data, thereby controlling a processing logic of the smart contract before requesting for issuing the smart contract, and preventing the execution of the smart contract from causing unexpected results.

Figure 6:
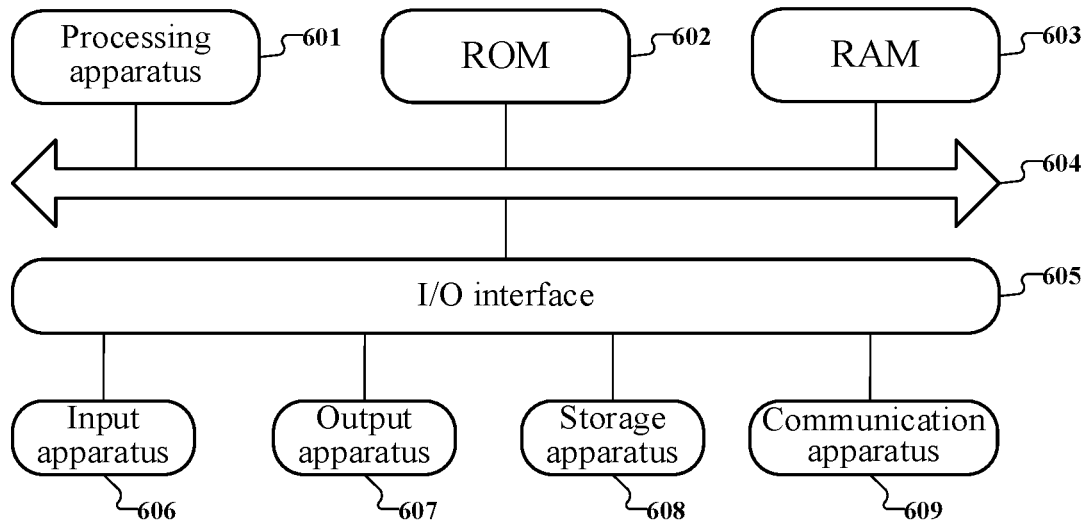
FIG. 6 is a schematic structural diagram adapted to implement an electronic device of embodiments of the present disclosure.

Referring to FIG. 6 below, a schematic structural diagram of an electronic device 600 (e.g., the terminal device in FIG. 1) adapted to implement embodiments of the present disclosure is shown. The terminal device in some embodiments of the present disclosure may include, but is not limited to, mobile terminals such as a mobile phone, a notebook computer, a digital broadcast receiver, a PDA (personal digital assistant), a PAD (tablet PC), a PMP (portable multimedia player), and a vehicle terminal (e.g., a vehicle navigation terminal), and fixed terminals such as a digital TV set, and a desktop computer. The terminal device shown in FIG. 6 is merely an example, and should not impose any limitation on the function and scope of use of the embodiments of the present disclosure.

As shown in FIG. 6, the electronic device 600 may include a processing apparatus 601 (e.g., a central processing unit or a graphics processing unit), which may execute various appropriate actions and processes in accordance with a program stored in a read-only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

In general, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal display device (LCD), a speaker, a vibrator, or the like; a storage apparatus 608 including a magnetic tape, a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to some embodiments of the present disclosure, the process described above with reference to the flow chart may be implemented as a computer software program. For example, some embodiments of the present disclosure include a computer program product, which includes a computer program that is tangibly embedded in a computer readable medium. The computer program includes a program code for executing the method as shown in the flow chart. In such an embodiment, the computer program may be downloaded and installed from a network via the communication apparatus 609, or be installed from the storage apparatus 608, or be installed from the ROM 602. The computer program, when executed by the processing apparatus 601, implements the above functions as defined by the method of some embodiments of the present disclosure.

It should be noted that the computer readable medium of some embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable storage medium may be any tangible medium containing or storing programs which may be used by, or used in combination with, a command execution system, apparatus, or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating, or transferring programs for use by, or use in combination with, a command execution system, apparatus, or element. The program codes contained on the computer readable medium may be transmitted with any suitable medium, including but not limited to: wire, an optical cable, a RF (radio frequency) medium etc., or any suitable combination of the above.

The computer readable medium may be included in the above terminal device; or may be a stand-alone computer readable medium without being assembled into the terminal device. The computer readable medium carries one or more programs, where the one or more programs, when executed by the terminal device, cause the terminal device to: acquire the smart contract; determine whether the smart contract includes a preset function; generate, in response to determining that the smart contract does not include the preset function, verification data of the smart contract based on a proof-of-work technology; and send a request for issuing the smart contract based on the verification data.

A computer program code for executing operations in some embodiments of the present disclosure may be compiled using one or more programming languages or combinations thereof. The programming languages include object-oriented programming languages, such as Java, Smalltalk, or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the accompanying drawings illustrate architectures, functions and operations that may be implemented according to the systems, methods, and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including an acquiring unit, a determining unit, a generating unit, and a sending unit. The names of the units do not constitute a limitation to such units themselves in some cases. For example, the acquiring unit may be further described as "a unit configured to acquire a smart contract."

The above description only provides explanation of the preferred embodiments and the employed technical principles of the present disclosure. It should be appreciated by those skilled in the art that the inventive scope involved in embodiments of the present disclosure is not limited to the technical solutions formed by the particular combinations of the above technical features. The inventive scope should also cover other technical solutions formed by any combination of the above technical features or equivalent features thereof without departing from the inventive concept of the present disclosure, for example, the technical solutions formed by interchanging the above features with, but not limited to, technical features with similar functions disclosed in the embodiments of the present disclosure.

What is claimed is:

1. A method for issuing a smart contract, comprising:
    acquiring the smart contract;
    determining whether the smart contract comprises a preset function, wherein the preset function refers to a function damaging security of a blockchain system and comprises at least one of: a function executing an input/output (I/O) operation of a file, a function invoking a script to control a system, a function executing a network-related operation, or a function controlling an environment variable of a system;
    generating, in response to determining that the smart contract does not comprise the preset function, verification data of the smart contract based on a proof-of-work technology, and based on an identification data of the smart contract,
    wherein the generation of the verification data comprises:
        obtaining a computing result based on the identification data and the smart contract;
        determining, in response to determining that the obtained computing result meets a preset workload requirement, the obtained computing result as the verification data;
    sending a request for issuing the smart contract based on the verification data; and
    issuing the smart contract.

2. The method according to claim 1, wherein the preset function further comprises a function using a time-varying variable.

3. The method according to claim 2, wherein the method further comprises:
    outputting, in response to determining that the smart contract comprises the preset function, a prompt message to prompt the smart contract being abnormal.

4. The method according to claim 1, wherein the generating the verification data of the smart contract based on the proof-of-work technology comprises:
    generating the verification data of the smart contract based on the proof-of-work technology and based on the identification data of the smart contract, wherein the identification data comprises at least one of: a random array and a preset identifier of a blockchain system.

5. The method according to claim 4, wherein the generating the verification data of the smart contract based on the proof-of-work technology and based on the identification data of the smart contract comprises:
    executing following computing steps: performing a hash operation on the identification data and the smart contract to obtain the computing result; determining whether the obtained computing result meets the preset workload requirement; determining, in response to determining that the obtained computing result meets the preset workload requirement, the obtained computing result as the verification data of the smart contract; and continuing, in response to determining that the obtained computing result does not meet the preset workload requirement, to execute the computing steps.

6. The method according to claim 4, wherein the generating the verification data of the smart contract based on the proof-of-work technology and based on the identification data of the smart contract comprises:
    generating, in response to determining that the smart contract is an officially issued smart contract, the verification data of the smart contract based on the proof-of-work technology and based on the identification data of the smart contract.

7. The method according to claim 1, wherein the determining whether the smart contract comprises the preset function comprises:
    determining whether a target custom function in the smart contract comprises the preset function, wherein the target custom function comprises a function in the smart contract except for a library function and a preset inspection-free function.

8. An apparatus for issuing a smart contract, comprising:
    at least one processor; and
    a memory storing instructions, wherein the instructions when executed by the at least one processor, cause the at least one processor to perform operations, the operations comprising:
    acquiring the smart contract;
    determining whether the smart contract comprises a preset function, wherein the preset function refers to a function damaging security of a blockchain system and comprises at least one of: a function executing an input/output (I/O) operation of a file, a function invoking a script to control a system, a function executing a network-related operation, or a function controlling an environment variable of a system;
    generating, in response to determining that the smart contract does not comprise the preset function, verification data of the smart contract based on a proof-of-work technology, and based on an identification data of the smart contract,
    wherein the generation of the verification data comprises:
        obtaining a computing result based on the identification data and the smart contract; determining, in response to determining that the obtained computing result meets a preset workload requirement, the obtained computing result as the verification data;

sending a request for issuing the smart contract based on the verification data; and issuing the smart contract.

9. The apparatus according to claim 8, wherein the preset function comprises a function using a time-varying variable.

10. The apparatus according to claim 9, wherein the operations further comprise:

outputting, in response to determining that the smart contract comprises the preset function, a prompt message to prompt the smart contract being abnormal.

11. The apparatus according to claim 8, wherein the generating the verification data of the smart contract based on the proof-of-work technology comprises:

generating the verification data of the smart contract based on the proof-of-work technology and based on the identification data of the smart contract, wherein the identification data comprises at least one of: a random array and a preset identifier of a blockchain system.

12. The apparatus according to claim 11, wherein the generating the verification data of the smart contract based on the proof-of-work technology and based on the identification data of the smart contract comprises:

executing following computing steps: performing a hash operation on the identification data and the smart contract to obtain the computing result; determining whether the obtained computing result meets the preset workload requirement; determining, in response to determining that the obtained computing result meets the preset workload requirement, the obtained computing result as the verification data of the smart contract; and continuing, in response to determining that the obtained computing result does not meet the preset workload requirement, to execute the computing steps.

13. The apparatus according to claim 11, wherein the generating the verification data of the smart contract based on the proof-of-work technology and based on the identification data of the smart contract comprises:

generating, in response to determining that the smart contract is an officially issued smart contract, the verification data of the smart contract based on the proof-of-work technology and based on the identification data of the smart contract.

14. The apparatus according to claim 8, wherein the determining whether the smart contract comprises the preset function comprises:

determining whether a target custom function in the smart contract comprises the preset function, wherein the target custom function comprises a function in the smart contract except for a library function and a preset inspection-free function.

15. A non-transitory computer-readable medium, storing a computer program thereon, wherein the program, when executed by a processor, causes the processor to perform operations comprising:

acquiring a smart contract;

determining whether the smart contract comprises a preset function, wherein the preset function refers to a function damaging security of a blockchain system and comprises at least one of: a function executing an input/output (I/O) operation of a file, a function invoking a script to control a system, a function executing a network-related operation, or a function controlling an environment variable of a system;

generating, in response to determining that the smart contract does not comprise the preset function, verification data of the smart contract based on a proof-of-work technology, and based on an identification data of the smart contract, wherein the generation of the verification data comprises:
obtaining a computing result based on the identification data and the smart contract; determining, in response to determining that the obtained computing result meets a preset workload requirement, the obtained computing result as the verification data;

sending a request for issuing the smart contract based on the verification data; and issuing the smart contract.

* * * * *